United States Patent [19]

VanSant

[11] Patent Number: 4,701,895
[45] Date of Patent: Oct. 20, 1987

[54] MAGNETIC BIASING APPARATUS FOR MAGNETO-OPTIC RECORDING INCLUDING A PERMANENT MAGNET

[75] Inventor: Glen J. VanSant, Bucks County, Pa.

[73] Assignee: RCA Corporation, Princeton, N.J.

[21] Appl. No.: 845,693

[22] Filed: Mar. 28, 1986

[51] Int. Cl.⁴ .................. G11B 5/03; G11B 13/04; G11B 11/14

[52] U.S. Cl. .................................. 369/13; 360/114; 360/59; 365/122

[58] Field of Search ............... 369/13; 360/114, 59, 360/60, 118; 365/122

[56] References Cited

FOREIGN PATENT DOCUMENTS 59-38951  3/1984  Japan ................................ 369/13
2083677  3/1982  United Kingdom ............. 369/13

*Primary Examiner*—Raymond F. Cardillo
*Assistant Examiner*—Hoa T. Nguyen

*Attorney, Agent, or Firm*—Clement A. Berard, Jr.; William H. Meise; C. L. Maginniss

[57] ABSTRACT

A magneto-optic disc recording system includes a cylindrical permanent magnet for providing magnetic biasing selectively for the recording and erasing processes. The magnet is positioned radially with respect to the disc rotation, on the opposite side of the disc from, but aligned with, the path of radial motion of the focused recording/erasing light beam. The poles of the magnet are diametrically opposed, and the magnet is axially rotatable. Circular eddy currents, induced by the magnetic field of the magnet on the surface of the rotating disc, generate a second magnetic field which opposes the field of the magnet, thus impelling rotation of the magnet. A stopping mechanism stops the rotation of the magnet with one or the other of its poles adjacent the disc, such that either a recording or erasing magnetic bias is selectively provided to the recording region.

20 Claims, 10 Drawing Figures

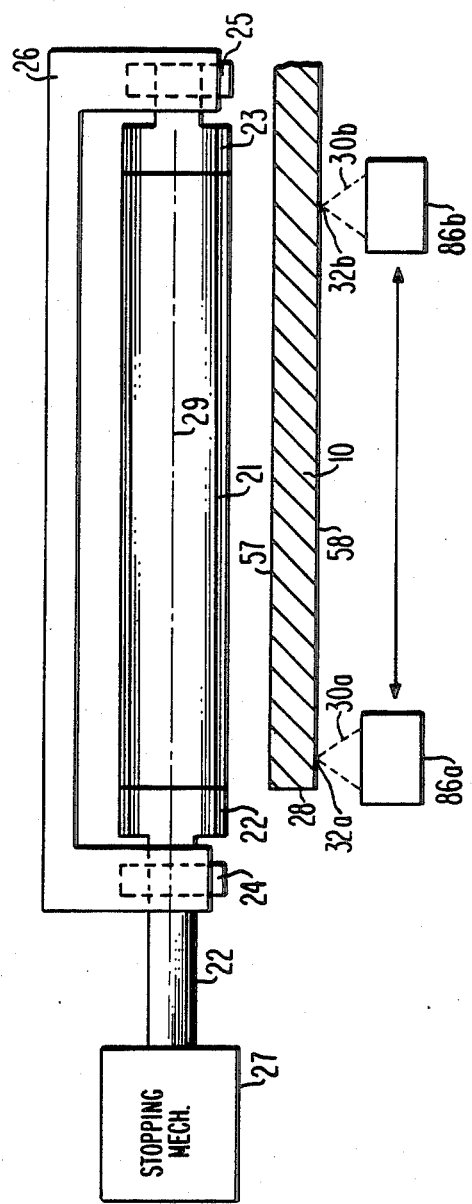

MAGNETIC BIASING APPARATUS FOR MAGNETO-OPTIC RECORDING INCLUDING A PERMANENT MAGNET

The United States Government has rights in this invention pursuant to a Government Contract.

This invention relates generally to magneto-optic recording systems and, more particularly, to an apparatus including a permanent magnet for providing a magnetic field in the recording region of a rotating disc.

BACKGROUND OF THE INVENTION

High density optical recording systems which may be used for recording and playing back information are known in the prior art. For example, U.S. Pat. No. 4,097,895, entitled "MULTI-LAYER OPTICAL RECORD," issued on June 27, 1978, to F. W. Spong, relates to an optical disc record/playback system wherein data are recorded on the surface of a recording medium. In a Spong system the thermal energy of a focused high intensity light beam causes variation in the optical properties on the surface of the recording medium. For example, in one system the thermal effects of a laser beam form pits in an absorptive coating on the surface of an optical disc. In the Spong system, approximately $10^{11}$ bits of information can be recorded on one side of a disc-shaped record medium having a thirty centimeter diameter.

Although the system of the previous example is directed toward archival, or permanent, storage, there have developed in recent years erasable media and recording techniques. Currently, magneto-optic materials are used in the state-of-the-art recording media to effect readily alterable recordings. A magneto-optic recording medium is a magnetic material which causes the polarization angle of laser light to be changed when reflected from a recorded spot. Preparatory to recording or playback operation, the molecules of the magneto-optic material across the entire recording surface are vertically oriented in one direction. During recording, the molecules of the magneto-optic material at the point of incidence of a laser beam are flipped in the opposite direction due to the presence of a magnetic field of a given strength and polarity and the heating induced by the laser. Illumination from a playback laser beam of lower power reflected from this area will show a polarization angle change. The erasing process then restores the molecular orientation condition which existed prior to recording by the use of a magnetic field of polarity opposite to that used for recording in the presence of a continuous wave laser beam.

The present invention addresses the problem of providing a reversible, vertically-oriented magnetic field in the region of the recording surface at the point of incidence of the laser beam. Traditionally, an electromagnet in which current (and, thus, the induced field) can be adjusted and reversed, has been the preferred source for generating a magnetic bias. Because of the very close proximity between the objective lens of the record/playback optics, there is very little space on the recording side of the disc for an electromagnet capable of providing a vertical magnetic field at the point of incidence, without expending large amounts of power, typically in excess of 15 watts.

There are also, however, disadvantages to backside magnetic biasing devices, those devices which apply a magnetic field from the reverse side of the disc opposite the recording/erasing beam. Because backside electromagnetic bias devices typically use air return paths resulting in high gradients of magnetic flux density through the disc, large amounts of power, in the order of 15-20 watts, are required to generate sufficient strength of a vertical magnetic field, typically 300 oersteds at the point of incidence of the recording/erasing beam.

The problems of a backside electromagnetic biasing device are compounded in the case where the disc has magneto-optic recording media on both surfaces, as where two single-sided discs are combined, resulting in a double-thickness, double-sided disc. The gradient of magnetic flux density is even greater through the double-thickness disc, and in order to provide the necessary field strength at the recording surface remote from the electromagnetic biasing device, the field intensity at the surface adjacent the biasing device may be sufficient to inadvertantly alter the data recorded thereon, even without the presence of laser heating.

SUMMARY OF THE INVENTION

In accordance with the principles of the present invention, an apparatus is disclosed for use in an optical system for recording information on a disc-shaped record medium, the record medium comprising an electrically-conductive material, the record medium having a first surface for recording information thereon and having a second surface opposite the first surface. The system includes drive means for rotating the record medium about a central axis thereof normal to the first surface. The system additionally includes source means for providing a focused beam of light incident on the first surface, and means for establishing radial relative motion between the light beam and the first surface. The disclosed apparatus generates a magnetic field of selectable polarity at the first surface adjacent the focused light beam. The apparatus comprises an elongated member having a longitudinal central axis. The member includes a permanent magnet having diametrically-opposed poles thereon. The member is located adjacent the second surface of the record medium and positioned such that its longitudinal axis is parallel to the first surface, radially disposed with respect to the axis of rotation of the record medium, and aligned with the path of motion of the light beam. The member is positioned with respect to the record medium such that the magnetic field of the magnet induces eddy currents in the record medium when the record medium rotates, which eddy currents generate a second magnetic field opposing the magnetic field of the magnet, the member being rotatable about its longitudinal axis. The apparatus further comprises means for stopping rotational motion of the member, the rotational motion of the medium being induced by the opposition of the magnetic field of the magnet to the second magnetic field associated with the nearby eddy currents. The stopping means stops the rotational motion of the member selectively at first and second positions of the poles of the magnet relative to the record medium, wherein the first position locates one of the diametrically-opposed poles adjacent the second surface of the record medium, and the second position locates the second of the diametrically-opposed poles adjacent the second surface of the record medium.

BRIEF DESCRIPTION OF THE DRAWINGS

FIG. 6 illustrates a magnetic biasing apparatus for use in the system of FIG. 1, embodying the principles of the present invention;

DETAILED DESCRIPTION OF THE PREFERRED EMBODIMENT

Figure 1:
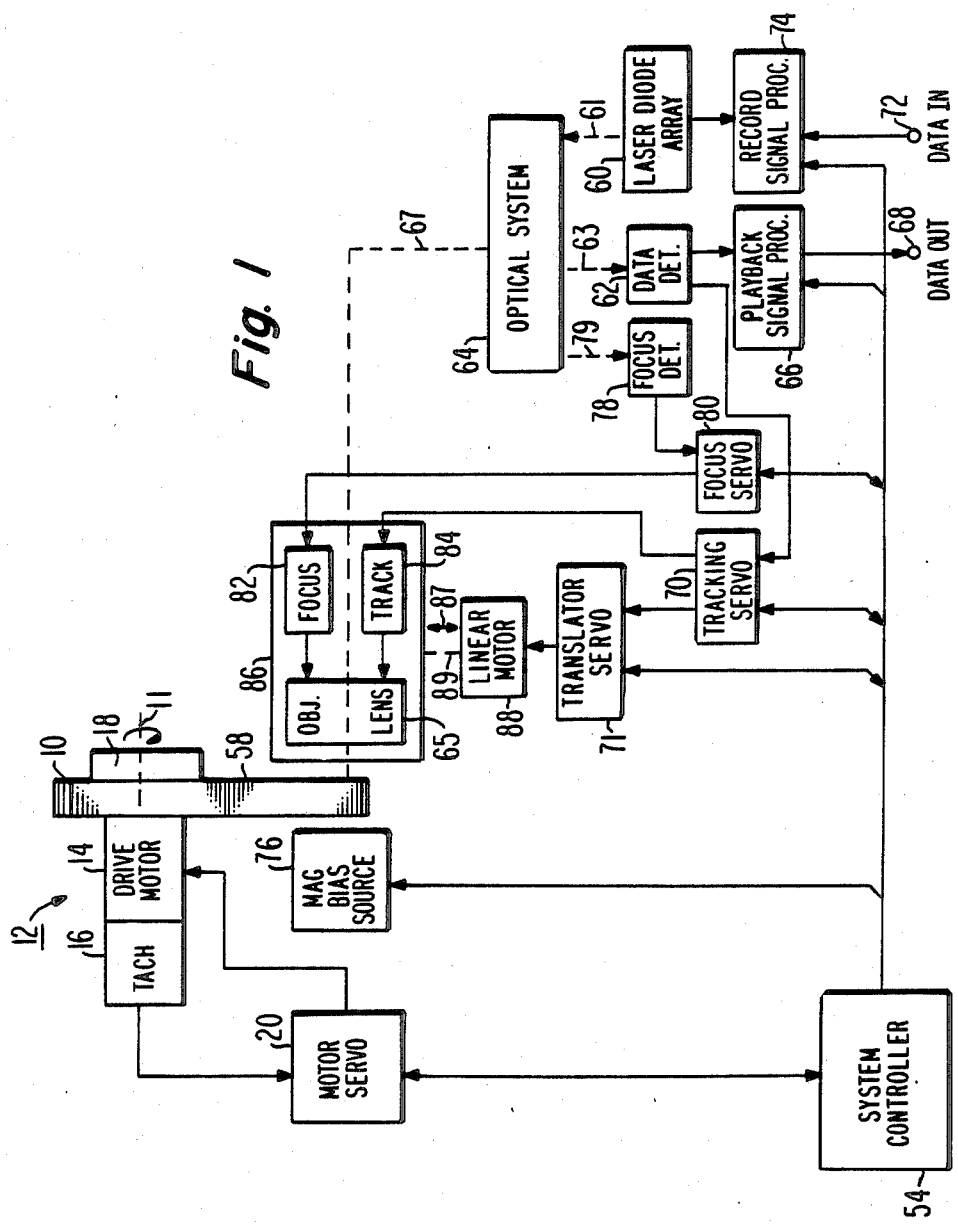
FIG. 1 illustrates, via a block diagram representation, a functional description of an optical information recording and playback system in which the present invention is embodied.

Referring to FIG. 1, there is shown a functional block diagram of an optical information recording and playback system in which the present invention is embodied. In operation, disc 10 is placed on turntable 12 which includes drive motor 14, tachometer 16 and hold-down mechanism 18 by which disc 10 is held in place. Disc 10 comprises an electrically-conductive, nonmagnetic substrate, such as aluminum, having a recording surface comprising a magneto-optic coating, such as a 5086-T6 alloy used in Winchester-type discs. After disc 10 is rigidly clamped to turntable 12, drive motor 14 is activated to rotate disc 10 about its central axis 11 at a predetermined angular speed, as measured by tachometer 16. Drive motor 14, which may typically be a brushless dc motor, is controlled by servo system 20 and includes tachometer 16 for the servo loop. Tachometer 16 may typically be an optical tachometer.

In the preferred embodiment of the present invention, the rate at which information is processed by recording on or playing back from the disc is enhanced by techniques of recording and playing back multiple tracks of information simultaneously. Multi-track recording is well known in the art and is described for use with magneto-optic media in U.S. patent application Ser. No. 803,003, filed Nov. 29, 1985, and assigned to the same assignee as the present invention. The above-cited reference describes a system in which a nine-element laser diode array includes eight elements for recording and playing back data, and one element for tracking on a preformatted, permanent pilot track. Such an array may be of the type disclosed in U.S. Pat. No. 4,520,472, issued May 28, 1985, to C. W. Reno.

Referring again to FIG. 1, the light from light source 60, which may be an array of nine diodes of the Reno type, is fed via optical path 61 into optical system 64 and from there, via optical path 67, into objective lens 65, where the nine beams are focused as diffraction-limited spots on recording surface 58 of disc 10. In the present example, recording surface 58 includes a magneto-optic layer. The beam focusing elements of optical system 64 and lens 65 may be similar to those disclosed in the Reno patent. The process of recording data on surface 58 includes receiving a stream of input data from a data source at input terminal 72 which is applied to recording signal processor 74. Under the supervision of system controller 54, processor 74 supplies eight signals to laser diode array 60 which are modulated in accordance with an encoded version of the input data received a terminal 72. Th eight modulated signals drive the eight data recording diodes of array 60. The pilot tracking diode of array 60 is never modulated; it operates in a continuous wave mode during both record and playback operation.

During the recording and erasing processes magnetic bias source 76, which is the subject matter of the present invention, acting under the control of system controller 54, provides a magnetic field in the area of disc 10 where the recording or erasing process is taking place, i.e., in close proximity to objective lens 65. The direction of the magnetic field determines whether a recording or erasing process is being effected. A detailed discussion of the magneto-optic recording, retrieving and erasing processes, used in the preferred embodiment, is provided in later paragraphs in conjunction with FIGS. 2 through 5.

During playback, diode array 60 provides nine, low-power, continuous wave beams directed onto the eight data tracks and one pilot track of disc surface 58 via optical path 61, optical system 64, optical path 67 and objective lens 65. A nine element detector 62 is responsive to the optical signals reflected from surface 58 and received through objective lens 65 and optical system 64, and via optical paths 67 and 63, to read the data recorded in eight tracks on surface 58 and also to detect the pilot track information. The eight detected data streams from detector 62 are applied to a playback signal processor 66 which, under the supervision of the system controller 54, generates a decoded stream of user output data at output terminal 68. The remaining information bit stream detected by data detector 62, read from the pilot track, is used to generate a tracking error signal which is applied to tracking servo 70.

A second data detector, focus detector 78, monitors information on recording surface 58, received via optical path 79, and determines therefrom the focal quality of the spots imaged by the objective lens 65 and optical system 64. Focus error signals are generated by detector 78 to focus servo 80.

It has been shown that a tracking error signal, generated by data detector 62, and a focus error signal, generated by focus detector 78, have been coupled, respectively, to tracking servo 70 and focus servo 80. These two servos, under the supervision of system controller 54, and in conjunction with a translator servo 71 controlling the motion of linear motor 88, produce three movements of the optical system so as to keep the beams from laser diode array 60 focused on their respective tracks. Focus servo 80 activates focus actuator 82 which induces motion of objective lens 65 toward or away from recording surface 58. Focus actuator 82 may typically be a voice coil which responds to an electrical signal to induce motion in a diaphragm to which objective lens 65 is coupled.

Tracking servo 70 generates two signals, both of which cause motion of objective lens 65 radially with respect to disc 10. A fine tuning tracking signal is applied to tracking actuator 84, which may typically be a galvonometer-controlled mirror, providing very fine adjustments to the positions of the laser diode beams directed onto recording surface 58. This fine tracking signal is typically an analog signal which drives tracking actuator 84 to a position which depends on the amount of current supplied by drive amplifiers in tracking servo 70. In the preferred embodiment, the functions of focus actuator 82 and tracking actuator 84 are combined in a single device, e.g., a two-axis focus lens actuator.

A coarse tracking signal from tracking servo 70 is applied via translator servo 71 to linear motor 88 which is coupled to optical platform 86 via mechanical linkage 8 and which causes motion of platform 86 radially with respect to disc 10 as shown by double-headed arrow 87. This coarse tracking signal is used to drive optical platform 86 to a desired track and also, in response to the current drive provided by tracking servo 70 to tracking actuator 84, causes linear motor 88 to drive platform 86 to a position which locates the center of the tracking actuator's field of view on the pilot track. Optical platform 86 is a structure on which are located objective lens 65, focus actuator 82 and tracking actuator 84.

System controller 54 comprises a stored-program processor which may typically be a microprocessor. It provides system control by generating signals to and receiving signals from the several subsystems of the recording/playback system. Controller 54 may typically command servo 20 to activate motor 14, and servo 20 may respond with status signals indicating, for example, servo out-of-lock or overspeed. System controller 54 may typically generate a command to magnetic bias source 76 indicating direction of the magnetic field. Controller 54 may typically command translator servo 71 to drive linear motor 88 to a specified track address, and may request track address status of servo 71. Controller 54 may typically command tracking servo 70 to jump a track or lock on a track, and may request status information from servo 70 concerning whether the limit of tracking actuator 84 has been exceeded. Finally, controller 54 may command focus servo 80 to drive focus actuator 82 into focus, and may request status information from servo 80 as to whether focus has been achieved.

In the system illustrated in FIG. 1, the preferred erasable disc media uses a magneto-optic process based on the Kerr effect to record and playback information. The Kerr effect operates on light reflected from a magnetized material to rotate its angle of polarization. The amount of change and sign of the angular change are dependent on the material and the direction of the magnetic field. The magneto-optic record, playback and erase processes are illustrated in FIGS. 2, 3, 4 and 5.

Figure 2:
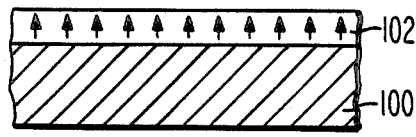
FIGS. 2, 3, 4 and 5 illustrate the magneto-optic processes, used in the system of FIG. 1.
Figure 3:
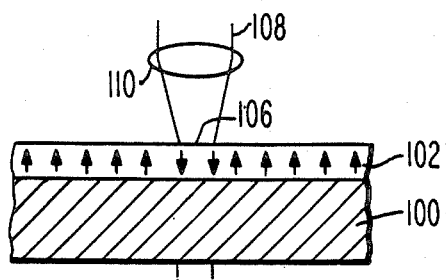

Referring to FIG. 2, there is shown disc 100 in cross-sectional view, with a thin, magneto-optic recording layer 102. Layer 102 is a vertically oriented magnetic material and, as shown in FIG. 2, is unrecorded. Recording is effected as shown in FIG. 3: magnetic bias source 104 produces a magnetic field H directed oppositely to the magnetic orientation of layer 102. When a spot 106 in the area influenced by the external magnetic field H is heated, as, for example, by a high power laser beam 108 focused by objective lens 110, the coercivity of the magnetic material of layer 102 decreases such that the magnetic vectors within layer 102 will align with the relatively weak external magnetic field H in heated region 106 produced by magnetic bias source 104. Therefore, the direction of the resulting local magnetic vector in sensitive layer 102 is determined by the direction of the applied external magnetic field H, and the size of this recorded feature is determined by the size of the focused spot 106.

Figure 4:
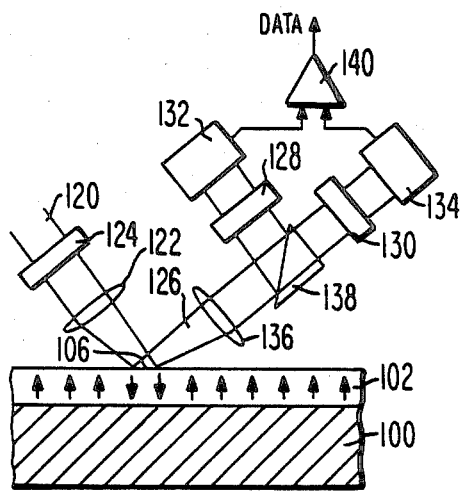

As shown in FIG. 4, recorded information is read by reflecting a linearly polarized light beam from the surface of the sensitive layer. A low-power, continuous wave laser beam 120 is focused onto recorded spot 106 by objective lens 122 and linearly polarized by polarizer 124. Upon reflection from the surface, a very small polarization rotation of the reflected beam 126, based upon the Kerr effect, is produced and its direction is dependent upon the orientation of the magnetic vectors in the area of layer 102 illuminated by beam 120.

The data readout signal is derived via differential detection of the polarization rotation. Reflected beam 126 is collected by collection lens 136, partially reflected by beam splitter 138, and passed through polarizers 128 and 130 whose polarization angles are at 90° to each other. The effect of the two polarizers 128, 130 on the reflected beam is to differentially vary the intensity of light passing therethrough depending on the polarization rotation of the reflected beam; i.e., as the beam illuminating layer 102 traverses between recorded and unrecorded spots, the amount of light energy passing through the two polarizers 128 and 130 varies in differential relation one to the other. The amplitudes of the optical signals passing through polarizers 128 and 130 are detected by detectors 132 and 134, respectively, and their output signals are compared by differential amplifier 140. The polarization rotation due to the magneto-optic recording process is very small, typically between one-half and two degrees.

Figure 5:
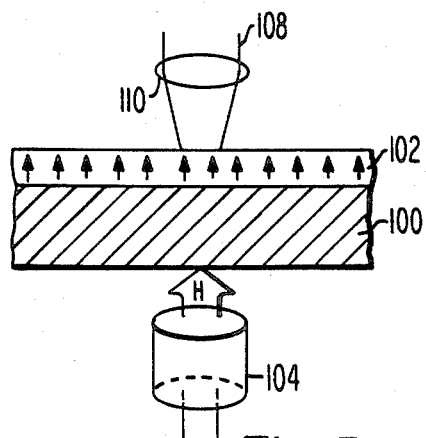

Erasure of the recording layer 102 is effected, as shown in FIG. 5, by reversing the external magnetic field H provided by magnetic bias source 104, and heating the recorded areas of layer 102 by the application of heat from high power laser beam 108, in a continuous wave mode, focused by objective lens 110. If the coercivity of the magnetic material of recording layer 102 is sufficiently small, or if the intensity of the magnetic field H is sufficiently large, erasure of the disc 100 may be accomplished merely by saturation with the magnetic field H of magnetic bias source 104 directed as shown in FIG. 5.

In accordance with the principles of the present invention, a magnetic biasing apparatus is shown in FIG. 6. The apparatus includes cylindrical permanent magnet 21 axially coupled between extension rods 22 and 23, which are supported for rotation by bearings 24 and 25, respectively. Bearings 24 and 25 are held by fixed frame assembly 26. Rod 22 extends past bearing 24 into stopping mechanism 27, which is positioned beyond the peripheral edge 28 of disc 10. Stopping mechanism 27 is described and shown in greater detail in a later paragraph referencing FIG. 9.

Frame assembly 26 and bearings 24 and 25 support permanent magnet 21 in close proximity to surface 57 of disc 10, which is the reverse of the recording surface 58 being processed by the opto-electronics system of FIG. 1. Magnet 21 is positioned such that its central axis 29 is parallel to recording surface 58 and disposed radially with respect to the axis of rotation 11 of disc 10 (see FIG. 1). In the FIG. 6 drawing, the rotational motion of disc 10 is normal to the sheet. In the present example, disc 10 rotates with a constant angular velocity of 16 revolutions per second. The path of motion of optical platform 86 is shown in one extreme position as platform 86b, focusing light beams 30a at point 32a on recording surface 58, and in its other extreme position as platform 86b, focusing light beams 30b at point 32b on recording surface 58. Thus, the path of motion of the focused light beams 30a, 30b, referred to collectively as beams 30, is a line joining points 32a and 32b. Axis 29 of magnet 21 is aligned with this path of motion of focused light beams 30.

In the preferred embodiment, magnet 21 is fabricated of the Alnico 8 alloy, is 3.0 inches (7.6 cm) in length, and 0.375 inch (9.5 mm) in diameter. Its span exceeds the approximately 2.5 inch width (6.4 cm) of usable recording area on surface 58 of disc 10, which may typically have an overall diameter of 14.0 inches (35.6 cm). When positioned at a distance of 0.125 inch (3.2 mm) from surface 57, magnet 21 provides a magnetic field intensity of at least 300 oersteds on surface 58 at the point of incidence 32 of focused light beams 30.

Extension rods 22 and 23 are coupled on a common axis 29 with magnet 21 using, as an example, an epoxy cement. Rods 22 and 23 are fabricated of a nonmagnetic material and may typically be made of aluminum. Beyond the point of connection with magnet 21, rods 22 and 23 have reduced diameters where they bear upon bearings 24 and 25, so that the outside diameters of bearings 24 and 25 may be not substantially greater than the diameter of magnet 21, thus permitting magnet 21 to be positioned as close to surface 57 as may be desired. Bearings 24 and 25 are preferably ball bearings; alternatively, they may comprise sleeve bearings.

Figure 7A:
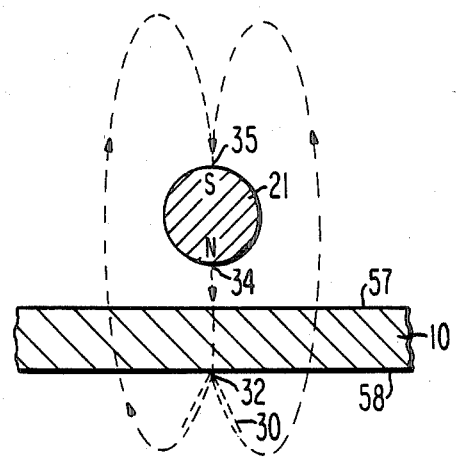
FIGS. 7a and 7b are cross-sectional views of the magnet of the FIG. 6 apparatus, showing its polar orientation relative, to the record disc.
Figure 7B:
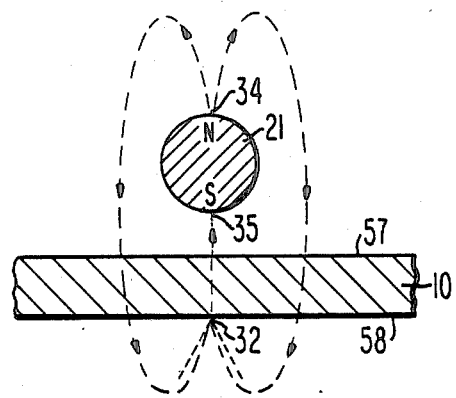

FIGS. 7a and 7b are cross-sectional views of magnet 21, showing its two polar orientations vis-a-vis surface 57 when positioned by stopping mechanism 27. In a first orientation, shown in FIG. 7a, the north (N) pole 34 of magnet 21 is adjacent surface 57, providing a magnetic field of a first direction at the point of incidence 32 of focused beams 30 on recording surface 58. In the second orientation, shown on FIG. 7b, the south (S) pole 35 of magnet 21 is adjacent surface 57, providing a magnetic field of a second direction, opposite the first direction, at the point of incidence 32 of focused beams 30 on recording surface 58.

Figure 8:
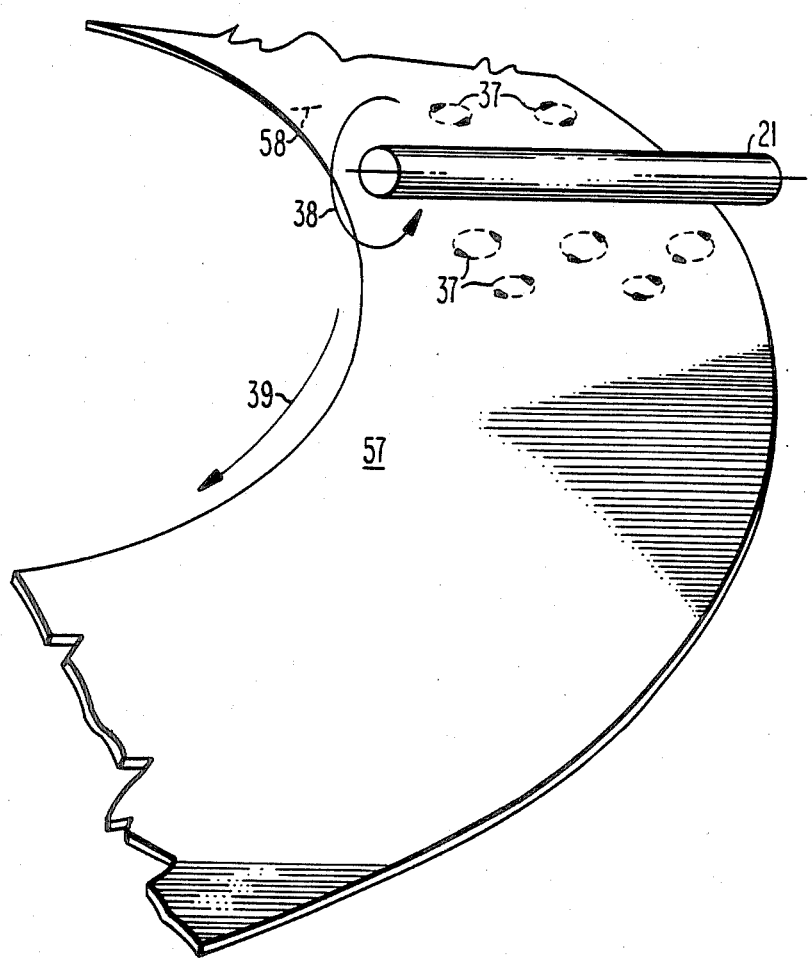
FIG. 8 illustrates the principles of magnetism employed by the FIG. 6 apparatus.

Referring to FIG. 8, a portion of disc 10 is shown in positional relation to magnet 21, indicating also their relative motions, to illustrate the principles of magnetism employed by the present invention. It is known that when an electrically-conductive body is exposed to a nonuniform magnetic field, circulating currents, referred to as eddy currents, are induced in the body of the conducting material. In addition, it is known that when an electrical current flows in a circular loop, a magnetic field is generated which has direction normal to the plane of the circle.

In the present example, when disc 10 rotates in a direction as shown by arrow 39, every point on surface 57 which passes under magnet 21 is influenced by its magnetic field. These points are exposed to an increasing magnetic field as they approach magnet 21, and to a decreasing field as they pass under magnet 21 and move away. This varying field, influencing every point on surface 57, induces eddy currents 37 on surface 57. These eddy currents 37 generate magnetic fields, substantially normal to surface 57, under and in the vicinity of magnet 21, which induced fields are opposite in direction to the field of magnet 21. Because magnet 21 is constrained by bearings (see FIG. 6), the opposition of its field to the eddy current fields causes it to rotate as shown by directional arrow 38.

Figure 9:
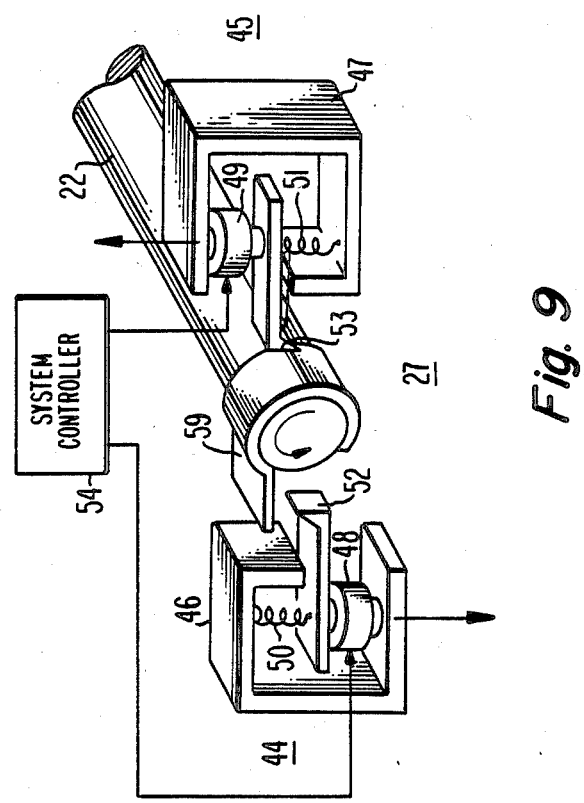
FIG. 9 illustrates the preferred embodiment of the stopping mechanism of the FIG. 6 apparatus.

Referring now to FIG. 9, there is shown in detail a preferred embodiment of the stopping mechanism 27 of the magnetic biasing apparatus of FIG. 6. Stopping mechanism 27 comprises two soleniod-controlled devices 44 and 45 positioned on either side of rotatable extension rod 22, and pawl 59 immovably clamped to rod 22 intermediate devices 44 and 45. As shown in FIG. 6, rod 22 is an axial extension of permanent magnet 21.

Device 44 comprises stopping tab 52 coupled between solenoid 48 and spring 50 within frame assembly 46. Solenoid 48 is responsive to an electrical signal from system controller 54 (see FIG. 1) to draw tab 52 downward, as shown by the arrow, against the force of spring 50. When solenoid 48 is de-energized, tab 52 is positioned so as to contact pawl 59, inhibiting counterclockwise rotational motion of rod 22; when solenoid 48 is energized, tab 52 is pulled downward, breaking contact with pawl 59, and rod 22 is free to rotate in a counter-clockwise direction.

Similarly, device 45 comprises stopping tab 53 coupled between solenoid 49 and spring 51 within frame assembly 47. Solenoid 49 is responsive to an electrical signal from system controller 54 (see FIG. 1) to draw tab 53 upward, as shown by the arrow, against the force of spring 51. When solenoid 49 is de-energized, tab 53 is positioned so as to contact pawl 59, inhibiting counterclockwise rotational motion of rod 22; when solenoid 49 is energized, tab 53 is pulled upward, breaking contact with pawl 59, and rod 22 is free to rotate in a counter-clockwise direction.

Solenoid-controlled devices 44 and 45 are positioned with respect to rod 22 such that when pawl 59 is at rest against tab 52, one of the magnetic poles of magnet 21 (see FIGS. 7a and 7b) is adjacent surface 57 of disc 10. When pawl 59 is at rest against tab 53, the other magnetic pole of magnet 21 is adjacent surface 57 of disc 10.

When disc 10 is in rotational motion, the magnetic field induced by the eddy currents which opposes the magnetic field of magnet 21, tends to rotate magnet 21 (and, hence, rod 22) in a counter-clockwise direction. Thus, pawl 59 is always urged against either tab 52 or tab 53. Therefore, in order to reverse the polarity of the magnetic field applied to disc 10 by magnet 21, as when changing between recording and erasing processes, it is required only to apply a pulse of electrical current to the appropriate solenoid 48 or 49, until rod 22 rotates past the corresponding tab 52 or 53 restraining pawl 59. In the present example, it is estimated that rod 22 will rotate, from rest, through 180° in one-half second; thus, a solenoid current pulse of one second is sufficient to ensure a polarity reversal of the magnetic field applied to disc 10 by permanent magnet 21.

While the foregoing description has specified surface 58 of disc 10 as the recording surface having a coating of a magneto-optic material thereon, disc 10 may be a double-sided disc, having magneto-optic coatings on both its planar surfaces 57, 58. An optical recording system employing such a double-sided disc might typically include two opto-electronic systems of the type shown in FIG. 1, and two magnetic biasing apparatus, as detailed in FIG. 6, each pair positioned, illustratively, in diametric opposition across disc 10, each pair processing data on the respective opposing surfaces of disc 10, simultaneously and independent of each other.

By way of summary, a magnetic biasing apparatus for use with a magneto-optic disc recording system has been described. By employing a cylindrical permanent magnet as the source of a magnetic field selectable for recording or erasing, the disclosed apparatus eliminates the need for an electrically-driven magnetic source, such as an electromagnet. In addition, by taking advantage of the counter magnetic field generated by the eddy currents on the rotating disc, the disclosed invention requires no energy to rotate and maintain the magnet in the record or erase polar positions. The disclosed invention requires only a short pulse of a relatively low current to operate a solenoid which releases the magnet to rotate, using the opposing magnetic fields to reposition the poles of the magnet relative to the recording surface.

While the principles of the present invention have been demonstrated with particular regard to the illustrated structure of the figures, it will be recognized that various departures from such illustrative structure may be undertaken in the practice of the invention. The scope of this invention is therefore not intended to be limited to the structure disclosed herein but should instead be gauged by the breadth of the claims which follow.

What is claimed is:

1. In an optical system for recording information on a disc-shaped record medium, said record medium comprising an electrically-conductive material, said record medium having a first surface for recording information thereon and having a second surface opposite said first surface, said system including drive means for rotating said record medium about a central axis thereof normal to said first surface, said system additionally including source means for providing a focused beam of light incident on said first surface, said system further including means for establishing radial relative motion between said light beam and said first surface, an apparatus for generating a magnetic field of selectable polarity at said first surface adjacent said focused light beam, said apparatus comprising:

an elongated member having a longitudinal central axis, said member including a permanent magnet having diametrically-opposed poles thereon, said member being located adjacent said second surface of said record medium and positioned such that its longitudinal axis is parallel to said first surface, radially disposed with respect to the axis of rotation of said record medium, and aligned with a path of motion of said light beam, said member being positioned with respect to said record medium such that the magnetic field of said magnet induces eddy currents in said record medium when said record medium rotates, which eddy currents generate a second magnetic field opposing the magnetic field of said magnet, said member being rotatable about its longitudinal axis; and means for stopping rotational motion of said member, said rotational motion of said member being induced by the opposition of the magnetic field of said magnet to said second magnetic field associated with a nearby eddy currents, said stopping means stopping the rotational motion of said member selectively at first and second positions of said poles of said magnet relative to said record medium, wherein said first position locates one of said diametrically-opposed poles adjacent said second surface of said record medium, and said second position locates a second of said diametrically-opposed poles adjacent said second surface of said record medium.

2. The apparatus according to claim 1 wherein said elongated member is cylindrical.

3. The apparatus according to claim 1 further including bearings for supporting said member for rotation.

4. The apparatus according to claim 3 wherein said bearings are ball bearings.

5. The apparatus according to claim 1 wherein said elongated member includes first and second rods joined at respective ends of said magnet, said rods being axial extensions of said magnet, said rods being of a nonmagnetic material.

6. The apparatus according to claim 1 wherein said means for stopping rotational motion of said member comprises:

a pawl affixed to said member, said pawl extending generally radially outward therefrom; and first and second stopping devices positioned on either side of said member adjacent said pawl, each of said stopping devices including a stopping tab coupled to a solenoid, said stopping tabs being positioned to engage said pawl and thereby inhibit rotational motion of said elongated member, each of said solenoids being responsive to an electrical signal for drawing a corresponding tab out of engagement with said pawl.

7. The apparatus according to claim 6 further including means for generating pulsed electrical signals individually to said solenoids for selectively enabling rotational motion of said elongated member.

8. An optical system for recording information on a disc-shaped record medium, said record medium comprising an electrically-conductive material, said record medium having a first surface for recording information thereon and having a second surface opposite said first surface, said system comprising:

drive means for rotating said record medium about a central axis thereof normal to said first surface;

source means for providing a focused beam of light incident on said first surface;

means for establishing radial relative motion between said light beam and said first surface; and means for generating a magnetic field of selectable polarity at said first surface adjacent said focused light beam, said generating means including an elongated member having a longitudinal central axis, said member including a permanent magnet having diametrically-opposed poles thereon, said member being located adjacent said second surface of said record medium and positioned such that its longitudinal axis is parallel to said first surface, radially disposed with respect to the axis of rotation of said record medium, and aligned with a path of motion of said light beam, said member being positioned with respect to said record medium such that a magnetic field of said magnet induces eddy currents in said record medium when said record medium rotates, which eddy currents generate a second magnetic field opposing the magnetic field of said magnet, said member being rotatable about its central axis, said generating means further including means for stopping rotational motion of said member, said rotational motion of said member being induced by the opposition of the magnetic field of said magnet to said second magnetic field associated with a nearby eddy currents, said stopping means stopping the rotational motion of said member selectively at first and second positions of said poles of said magnet relative to said record medium, wherein said first position locates one of said diametrically-opposed poles adjacent said second surface of said record medium, and said second position locates a second of said diametrically-opposed poles adjacent said second surface of said record medium.

9. The system according to claim 8 wherein said elongated member is cylindrical.

10. The system according to claim 8 further including bearings for supporting said member for rotation.

11. The system according to claim 10 wherein said bearings are ball bearings.

12. The system according to claim 8 wherein said elongated member includes first and second rods joined at respective ends of said magnet, said rods being axial extensions of said magnet, said rods being of a nonmagnetic material.

13. The system according to claim 8 wherein said means for stopping rotational motion of said member comprises:

a pawl affixed to said member, said pawl extending generally radially outward therefrom; and first and second stopping devices positioned on either side of said member adjacent said pawl, each of said stopping devices including a stopping tab coupled to a solenoid, said stopping tabs being positioned to engage said pawl and thereby inhibit rotational motion of said elongated member, each of said solenoids being responsive to an electrical signal for drawing a corresponding tab out of engagement with said pawl.

14. The system according to claim 13 further including means for generating pulsed electrical signals individually to said solenoids for selectively enabling rotational motion of said elongated member.

15. The system according to claim 8 wherein said first surface of said record medium includes a coating of a magneto-optic substance.

16. The system according to claim 8 wherein said source means includes a laser diode array.

17. The system according to claim 8 wherein said source means includes an objective lens.

18. The system according to claim 8 wherein said source means includes a galvanometer-controlled mirror.

19. The system according to claim 8 wherein said source means includes a focus actuator.

20. The system according to claim 8 wherein said means for establishing radial relative motion includes a linear motor.

* * * * *

UNITED STATES PATENT AND TRADEMARK OFFICE
CERTIFICATE OF CORRECTION

PATENT NO. : 4,701,895

DATED : October 20, 1987

INVENTOR(S) : Glen James VanSant

It is certified that error appears in the above-identified patent and that said Letters Patent is hereby corrected as shown below:

On the title page

Add to the REFERENCES CITED section the following:

Signed and Sealed this

Fifteenth Day of March, 1988

Attest:

DONALD J. QUIGG

*Attesting Officer*  *Commissioner of Patents and Trademarks*